US010268167B2

(12) United States Patent
Delizy et al.

(10) Patent No.: US 10,268,167 B2
(45) Date of Patent: Apr. 23, 2019

(54) DEVICE FOR MANAGING ELECTRICAL CONSUMPTION

(71) Applicant: Voltalis, Paris (FR)

(72) Inventors: Florian Delizy, Fontenay sous Bois (FR); Hugues Lefebvre de Saint Germain, Sainte Foy les Lyon (FR); Jean-Marc Oury, Paris (FR); Bruno Heintz, Paris (FR)

(73) Assignee: Voltalis, Paris (FR)

( * ) Notice: Subject to any disclaimer, the term of this patent is extended or adjusted under 35 U.S.C. 154(b) by 279 days.

(21) Appl. No.: 15/125,317

(22) PCT Filed: Mar. 10, 2015

(86) PCT No.: PCT/FR2015/050596
§ 371 (c)(1),
(2) Date: Sep. 12, 2016

(87) PCT Pub. No.: WO2015/136216
PCT Pub. Date: Sep. 17, 2015

(65) Prior Publication Data
US 2017/0075322 A1 Mar. 16, 2017

(30) Foreign Application Priority Data
Mar. 13, 2014 (FR) .................................. 14 52094

(51) Int. Cl.
*G05B 9/02* (2006.01)
*G05B 13/02* (2006.01)
(Continued)

(52) U.S. Cl.
CPC ........... *G05B 13/0205* (2013.01); *G05B 9/02* (2013.01); *G05B 15/02* (2013.01); *H01R 12/727* (2013.01);
(Continued)

(58) Field of Classification Search
CPC ...... G05B 13/0205; G05B 9/02; G05B 15/02; G05B 2219/2642; H01R 12/727;
(Continued)

(56) References Cited

U.S. PATENT DOCUMENTS 6,731,503 B2    5/2004   Privett et al.
6,967,849 B1   11/2005   Hwang et al.
(Continued)

OTHER PUBLICATIONS

Abstract of Korean Patent—KR2001473080000, dated Jun. 15, 1999, 4 pages.
(Continued)

*Primary Examiner* — Carlos Amaya
(74) *Attorney, Agent, or Firm* — Dority & Manning, P.A.

(57) ABSTRACT

The device for managing electrical consumption includes includes a plurality of connectors capable of each receiving a link to an electrical current line, and able to form input connectors and output connectors, a processing circuit for managing the electrical consumption on the electrical current lines to which it is connected, linked to at least one of the input connectors and to at least one of the output connectors, and includes a printed circuit which receives electronic components, a housing able to be installed in a low-voltage electrical installation board, exhibiting two opposite ends and at least one opening along each end, and accommodating the plurality of connectors along the opposite ends of the housing, and the processing circuit between the opposite ends, at least some of the openings remaining partially free when the connectors receive an electrical line.

13 Claims, 3 Drawing Sheets

(51) Int. Cl.
    *H01R 12/72*     (2011.01)
    *H02B 1/48*     (2006.01)
    *G05B 15/02*     (2006.01)
    *H02J 3/14*     (2006.01)

(52) U.S. Cl.
    CPC ....... *H02B 1/48* (2013.01); *G05B 2219/2642* (2013.01); *H02J 3/14* (2013.01); *Y02B 70/3241* (2013.01); *Y04S 20/227* (2013.01)

(58) Field of Classification Search
    CPC ......... H02B 1/48; H02J 3/14; Y02B 70/3241; Y04S 20/227
    USPC .......................................................... 307/24
    See application file for complete search history.

(56) References Cited

U.S. PATENT DOCUMENTS

| | | |
|---|---|---|
| 8,657,031 B2 | 2/2014 | Kononenko et al. |
| 2010/0112831 A1* | 5/2010 | Asada ................ B60R 16/0239 439/76.2 |

OTHER PUBLICATIONS

International Search Report for PCT/FR2015/050596 dated May 15, 2015, 2 pages.

\* cited by examiner

DEVICE FOR MANAGING ELECTRICAL CONSUMPTION

CROSS-REFERENCE TO RELATED APPLICATIONS

This application is the national stage entry of International Patent Application No. PCT/FR2015/050596 having a filing date of Mar. 10, 2015, which claims priority to and the benefit of French Patent Application No. 1452094 filed with the French National Institute of Industrial Property on Mar. 13, 2014, the entire contents of which are incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

The invention relates to devices for managing electrical consumption.

The problem of the balance between electrical production and consumption arises continually on account of variations in consumption and the impossibility of storing electrical energy. This constraint requires that players in the electrical system avail themselves of means for adjusting production and consumption at any time and not only during periods of peak consumption.

To address this problem, the Applicant has developed the notion of diffuse curtailment, a principle which consists in tailoring consumption by interrupting in a synchronized and temporary manner the operation of certain electrical equipment without the users being aware of it.

Accordingly, devices are therefore needed which are capable of measuring the instantaneous consumption of the usage of each site, and/or capable of suspending the supply on command.

Achieving such devices is all the more complex as they must be placed in electrical installations of restricted size (such as for example the electrical boards of homes or tertiary sites), thus implying very significant constraints.

Regulatory constraints arise, in addition to these dimensioning constraints. Indeed, it is not permitted to use active cooling means in these devices, since a fault with these means would risk, for example, causing a fire, and since the devices are locked and inaccessible to users in order to protect them.

However, to measure or suspend the current, it has to be diverted through elements which will exhibit a certain impedance. Having regard to the current and the voltage involved (up to 20 A at 230V on 5 pathways), the instantaneous power to be passively dissipated is of the order of 100 to 200 W, this being extremely high in the limited space considered (such as for example in the typical case of products integrated into an electrical board).

Existing devices are unsatisfactory: they are too large, or do not enable the current to be measured and/or suspended for more than one line.

The invention improves the situation.

BRIEF SUMMARY OF THE INVENTION

For this purpose, the invention proposes a device for managing electrical consumption, which comprises:
  a plurality of connectors capable of each receiving a link to an electrical current line and suitable for forming input connectors and output connectors,
  a processing circuit for managing the electrical consumption on the electrical current lines, to which it is connected, linked to at least one of the input connectors and to at least one of the output connectors, and comprising a printed circuit which receives electronic components,
  a box being able to be installed in a low-voltage electrical distribution board, exhibiting two opposite ends and at least one opening along each end, and housing on the one hand the plurality of connectors along said opposite ends of the box, and on the other hand the processing circuit between said opposite ends, at least some of said openings remaining partially free when the connectors receive an electrical line.

The printed circuit of the processing circuit is disposed in the box so as to define a first separate space and a second separate space, the electronic components capable of conducting currents of at least 5 A being received on the printed circuit so that they are housed in the first space with the plurality of connectors, in proximity to one of said opposite ends of the box.

The design of this device and the particular arrangement of the printed circuit of the processing circuit make it possible to define an air circulation corridor.

According to diverse variant embodiments, the device can exhibit the following characteristics:
  at least some of the openings receive at least some of the plurality of connectors,
  when the connectors receive electrical current lines, the free cross-section of the openings of one of the ends of the box is greater than or equal to the free cross-section of the openings of the other end of the box,
  the processing circuit is a measurement circuit designed to determine an instantaneous electrical consumption on one or more electrical lines linked to the output connectors,
  the measurement circuit comprises a plurality of shunts disposed in the first space, each linked to a respective pair of connectors comprising an input connector and an output connector, and to a device for measuring the current passing through each shunt,
  the processing circuit is a control circuit designed to selectively interrupt the provision of current on one or more of the electrical lines linked to the output connectors,
  the control circuit comprises a plurality of elements chosen from among the group comprising relays, TRI- ACs-DIACs and thyristors, and said elements are disposed in the first space, each linked to a respective pair of connectors comprising an input connector and an output connector, the printed circuit determining the first and second spaces is the printed circuit of the control circuit, and the printed circuit of the measurement circuit extends substantially orthogonally with respect to the printed circuit of the control circuit, so that the power conductors liable to liberate the most heat of the measurement circuit and of the control circuit are housed in the first space.

the device furthermore comprises a supply circuit disposed in the second space, the device furthermore comprises a pilot circuit disposed in the second space, the device is capable of managing an electrical power equal to 23 kW, the device is capable of managing an electrical power of 426 W per millimeter of width of the box, and the device is capable of managing an electrical power of 72 W per unit volume in $cm^3$ of the box.

BRIEF SUMMARY OF THE SEVERAL VIEWS OF THE DRAWINGS

Other characteristics and advantages of the invention will be better apparent on reading the description which follows, derived from examples given by way of nonlimiting illustration and derived from the diagrams in which.

The drawings and the description hereinafter contain, in essence, elements of a definite character. They will therefore be able not only to serve to better elucidate the present invention, but also to contribute to its definition, as appropriate.

DETAILED DESCRIPTION OF THE INVENTION

FIGS. 1 to 5 represent several views of one and the same embodiment of the invention. Consequently, they will be described in parallel, referring to each figure when necessary.

Figure 1:
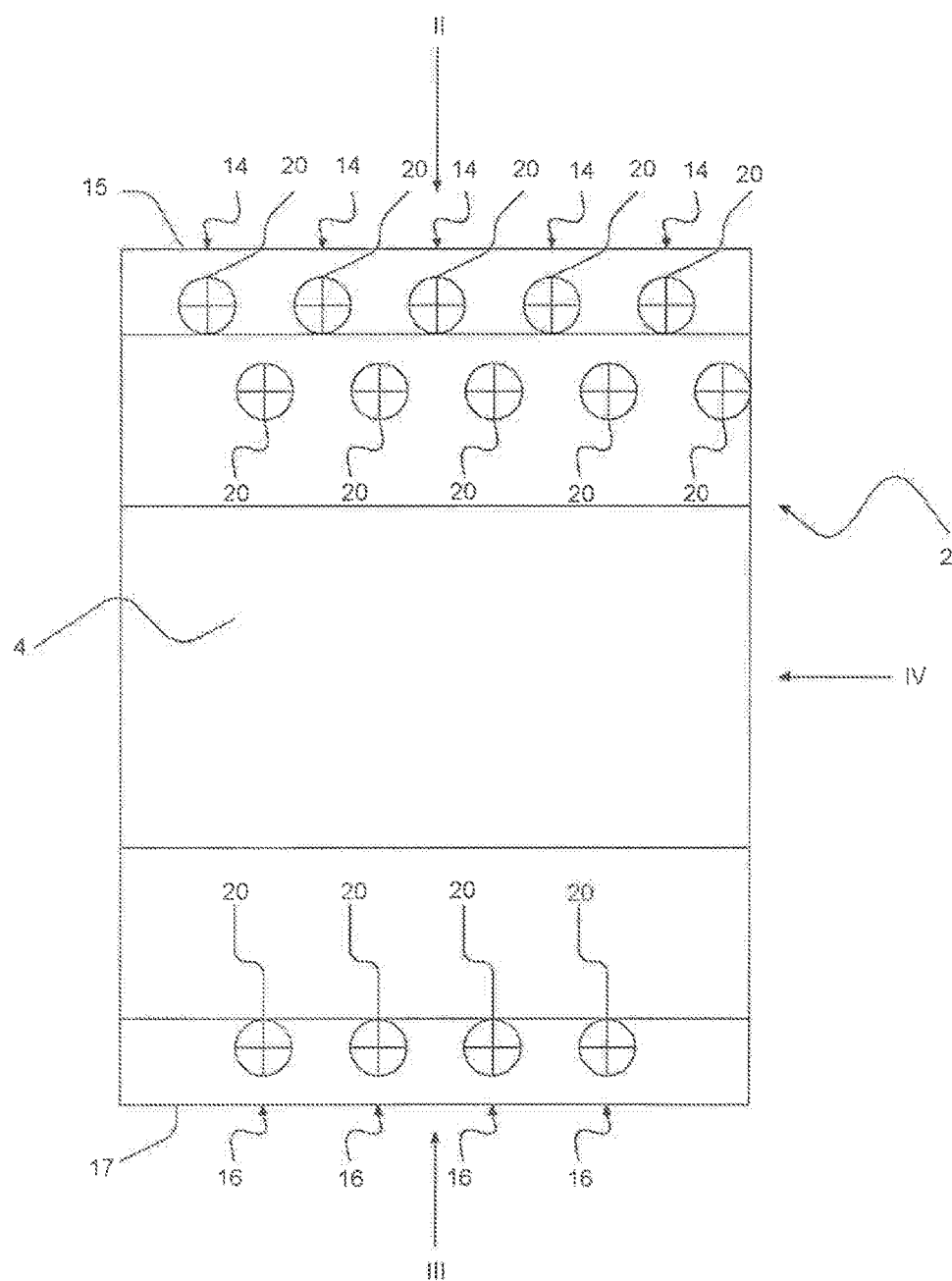
FIG. 1 represents a front schematic view of a device according to the invention when it is oriented as in a state installed in an electrical board.

FIG. 1 represents a device for managing electrical consumption 2 according to the invention. FIG. 1 is a front schematic view, such as the device 2 appears when it is in place in an electrical board. In what follows, relative terms such as "top" or "bottom", "left" or "right" are defined with respect to this reference view. Likewise, it will be possible to speak of width and of height with respect to FIG. 1, and of depth with respect to a direction orthogonal to the plane of FIG. 1.

Figure 4:
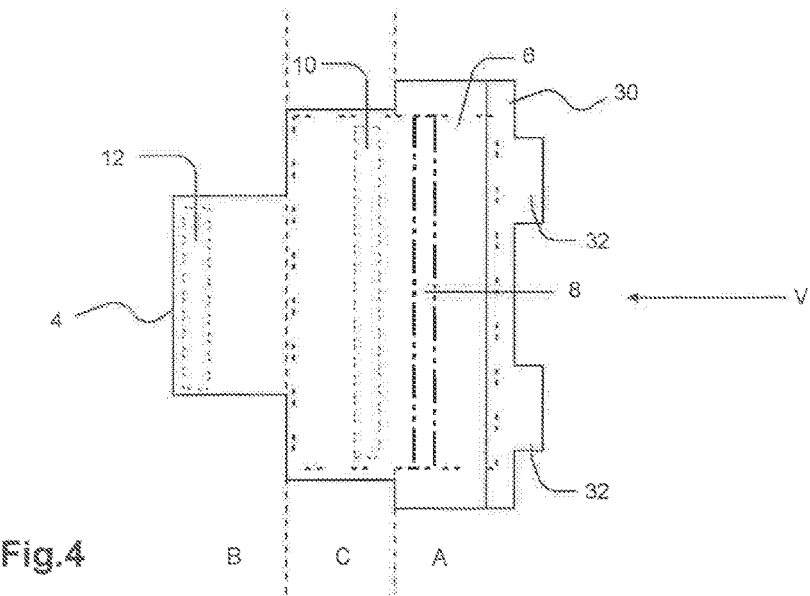
FIG. 4 represents a schematic view along the arrow IV of FIG. 1.
Figure 5:
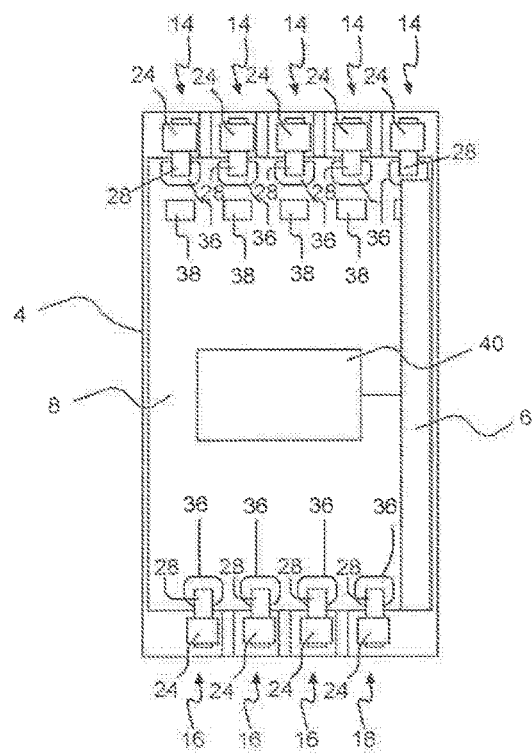
FIG. 5 represents a schematic view of the interior of the device of FIG. 1 along the arrow V of FIG. 4.

The device 2 comprises a box 4 which, in the example described here, houses a measurement circuit 6, a control circuit 8, a supply circuit 10 and a pilot circuit 12 (see FIGS. 4 and 5). The measurement circuit 6 and the control circuit 8 each form a processing circuit.

In the example described here, the box 4 comprises five through openings referenced 14 formed along an end 15 to receive electrical lines linked to the current source of an electrical installation, and four through openings referenced 16 formed along an opposite end 17 to receive electrical lines, the management of whose electrical consumption is sought. There is therefore one more opening 14 than the number of openings 16. The additional opening 14 (leftmost in FIG. 1) is used to supply power to the device 2. The openings 14 and 16 are provided at the level of the opposite ends 15 and 17 of the box 4, which respectively define the top and the bottom of the box 4 when the latter is received in a low-voltage electrical distribution board.

In the example described here, except for the additional opening 14, the other openings must be considered pairwise, each pair relating to an electrical line to be managed. Thus, in FIG. 1, the rightmost opening 14 forms a pair with the rightmost opening 16, the second rightmost opening 14 is associated with the second rightmost opening 16, the middle opening 14 is associated with the second leftmost opening 16, and the second leftmost opening 14 is associated with the leftmost opening 16. Each electrical line is held in place in an opening 14 or 16 by a terminal strip which will be described below and a clamping screw 20 of which is apparent. The box 4 also exhibits four openings 22 for receiving neutral electrical lines. As a variant, the openings 22 may be omitted. As a variant, the screws 20 could be replaced with clips, or with any other suitable fixing mechanism.

From an electrical point of view and ignoring the additional opening 14, the openings 14 of the example described here are input openings, while the openings 16 are output openings. As a variant, some or all the openings 14 could be output openings, and some or all the openings 16 could be input openings. Furthermore, the openings 14 and 16 could also be associated in a different manner from that described above.

Figure 2:
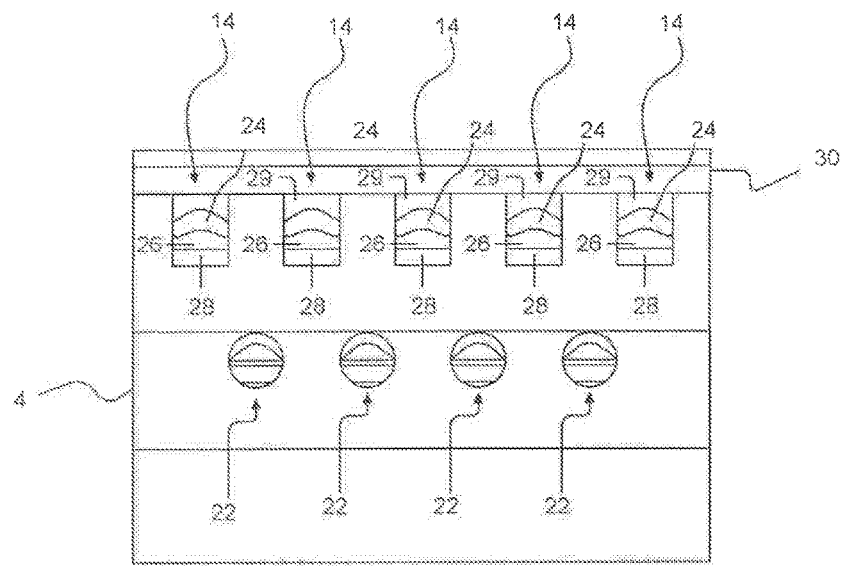
FIG. 2 represents a schematic view along the arrow II of FIG. 1.

FIG. 2 represents a view of the device of FIG. 1 along the arrow II, and can therefore be seen as a view from above. It affords a better view of the input openings 14 as well as the openings 22 for receiving neutral electrical lines.

As may be seen in this figure, each opening 14 receives a terminal strip 24 which exhibits a recess 26 in which a connector 28 is received. Thus, an electrical line can be received between the terminal strip 24 and the connector 28, the screws 20 allowing their coupling. In the example described here, the connectors 28 have a lamella shape. The shape of each terminal strip is designed in such a way that, when an electrical line is received between the terminal strip 24 and the connector 28, the opening 14 and the recess 26 remain at least partially clear, so that a through opening 29 is always present between the interior and the exterior of the box 4 at the level of each terminal strip 24.

Figure 3:
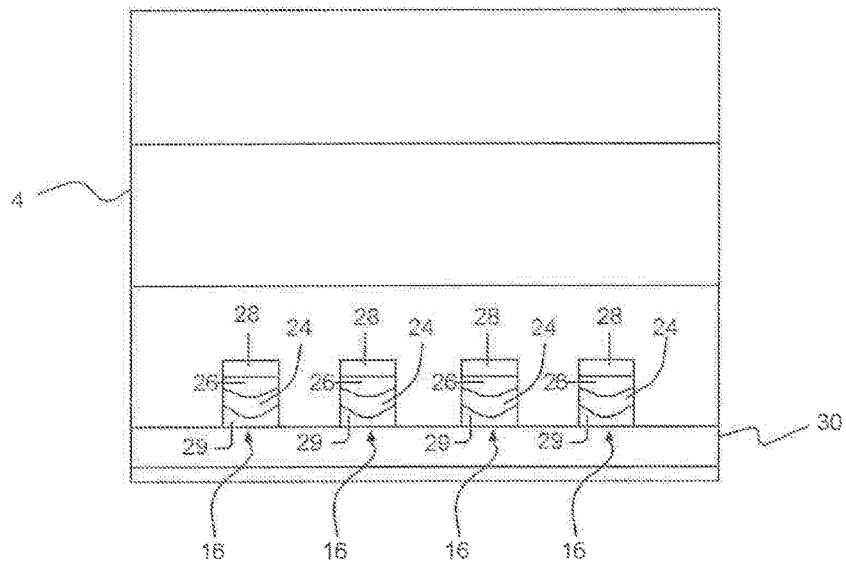
FIG. 3 represents a schematic view along the arrow III of FIG. 1.

FIG. 3 represents a view of the device of FIG. 1 along the arrow III, and can therefore be seen as a view from below. It affords a better view of the output openings 16.

As may be seen in this figure, each opening 16 receives a terminal strip 24 which exhibits a recess 26 in which a connector 28 is received. Thus, an electrical line can be received between the terminal strip 24 and the connector 28, the screws 20 allowing their coupling. In the example described here, the connectors 28 have a lamella shape. The shape of each terminal strip is designed in such a way that, when an electrical line is received between the terminal strip 24 and the connector 28, the opening 16 and the recess 26 remain at least partially clear, so that a through opening 29 is always present between the interior and the exterior of the box 4 at the level of each terminal strip 24.

In the example described here, the cross-section of the set of through openings 29 of the openings 14 (designed to be disposed at the top when the device 2 is installed in an electrical board) is substantially equal to the cross-section of the set of through openings 29 of the openings 16 (designed to be disposed at the bottom when the device 2 is installed in an electrical board).

As a variant, when the connectors receive electrical lines, the free cross-section of the openings of the end of the box 4 designed to be disposed at the top when the device 2 is installed in an electrical board is greater than the free cross-section of the openings of the opposite end of the box 4.

It is therefore apparent that what matters is the free area after receiving the electrical lines. The number of openings 14 or 16 is not predominant. Moreover, the connectors 28 could be received in such a way as to close the box 4, while openings 14 and 16 along the ends 15 and 17 to allow air circulation are provided.

FIG. 4 represents a view of the device of FIG. 1 along the arrow IV, and can therefore be seen as a side view. It affords a better view of the shape of the box 4, as well as the measurement circuit 6, the control circuit 8, the supply circuit 10 and the pilot circuit 12 which are represented dotted (in see-through style).

As may be seen in this figure, the box 4 exhibits three distinct portions in the depth sense, which also appear in FIGS. 1 to 3. The first portion referenced A exhibits the smallest depth and receives the openings 14 and 16. The second portion referenced B exhibits the biggest depth and receives the pilot circuit 12. Finally, the third portion referenced C is disposed between the first portion referenced A and the second portion referenced B, and receives the supply circuit 10 as well as the openings 22.

The measurement circuit 6 is received in part in the first portion referenced A which exhibits the lowest depth, and in part in the third portion referenced C. The control circuit 8 is disposed substantially perpendicularly to the measurement circuit 6, and is received in the first portion referenced A.

The first portion referenced A exhibits a slightly bigger height than the third portion referenced C. This provides access to the screws 20 for clamping the connectors 28 and the terminal strips 24. The second portion referenced B is the portion which exhibits the smallest height since it is constrained by the installation in an electrical board.

Indeed, once the device 2 has been installed in an electrical board, a user sees only the part that corresponds to the wall of the second portion referenced B leftmost in FIG. 4. However, from the thermal point of view, the portions B and C can be seen as a single space, which extends as far as the control circuit 8. As will be seen below, the control circuit 8 delimits two spaces in the box 4, respectively on either side of the control circuit 8.

As may be seen in this figure, the box 4 exhibits a cover 30. The cover 30 exhibits two portions 32 protruding along the direction of the arrow V exhibiting means for fastening to an electrical board.

FIG. 5 represents a view of the interior of the device of FIG. 1 along the arrow V of FIG. 4. The connectors 28 are linked to the measurement circuit 6 by way of solder welds 36 and shunts 38 which are received on the control circuit 8. The four solder welds 36 which correspond to the electrical lines that it is desired to manage (that is to say all except the electrical line intended for the supply of the device 2) are each linked to one of the shunts 38. The shunts 38 make it possible to measure the current passing through each electrical line. A measurement in parallel of the supply voltage, for example on the electrical line intended for supplying the device 2, thus makes it possible to recover the electrical power consumed on each of the managed electrical lines. The shunts 38 constitute electronic elements capable of passing a current of 5 A and which dissipate a significant quantity of heat, of the order of 8 W per shunt.

FIG. 5 also shows a block 40 linked to the control circuit 8. The block 40 comprises a plurality of relays which are each linked to one of the connectors 28 of the output openings 16, and enable the supply to the electrical lines to be suspended selectively and individually. During switching, the relays of the block 40 are also liable to dissipate a significant quantity of heat. As a variant, the relays of the block 40 could be replaced with TRIACs-DIACs, thyristors or other electronic elements for controlling the current. As a variant, the block 40 can be designed to suspend or command the supplying of all the electrical lines simultaneously, and can comprise a single relay, TRIAC-DIAC or thyristor.

It is therefore apparent that the control circuit 8 comprises a printed circuit which divides the box 4 into two spaces. The first space, as was explained above, comprises the openings 14 and 16, houses the connectors 28, the shunts 38, as well as the block 40. Thus, all the elements which liberate the most heat are arranged in the first space, and out of these, the elements which liberate the most heat, that is to say the shunts 38, are disposed in the upper part of the first space when the device 2 is fitted in place in an electrical installation.

Stated otherwise, the elements which liberate the most heat are disposed in proximity to the connectors 28 received in the openings 14, that is to say in proximity to the end which defines the top of the box 4 when the latter is received in a low-voltage electrical distribution board. The measurement circuit 6 and/or the control circuit 8 are received between the ends of the box 4 which receive the connectors 28 and which respectively define the top and the bottom of the box 4 when the latter is received in a low-voltage electrical distribution board.

In the example described here, the elements of the device 2 which liberate the least heat are received in the second space. As a variant, at least some of the elements which liberate the least heat could also be received in the first space.

As the openings 14 and 16 remain open, even when they receive electrical lines at input and at output, and as the first space receives all the elements of the device 2 which liberate the most heat, the arrangement of the device 2 makes it possible to create an air current in the first space.

This arrangement makes it possible to passively cool the device 2 despite the significant liberation of heat of the power-conducting elements that it encloses.

The power-conducting electrical or electronic elements which are liable to liberate the most heat on account of the current which passes through them may be designated by the expression "hot element". For example, the shunts may each be subjected to a current of an average power of 4.6 kW, thus requiring a large thermal dissipation capacity. This therefore represents up to 23 kW of power to be managed.

Conversely, "cold element" is understood to mean the power-conducting elements which are liable to liberate the least heat, such as for example the microcontroller of the pilot circuit 12. The terms "hot element" and "cold element", although of a relative nature, therefore find a precise technical sense within the framework of the invention.

The hot elements of the measurement circuit 6 and of the control circuit 8 are situated in the first space, while the cold elements are situated in the second space. In the case of the control circuit 8 whose printed circuit serves as separating wall between the first space and the second space, this is achieved by welding the hot elements and the cold elements on either side of the printed circuit. In the case of the measurement circuit 6, which is arranged orthogonally with respect to the plane of the printed circuit of the control circuit 8, it suffices to weld the hot and cold elements on either side of the latter. This "90°" arrangement makes it possible to limit to the maximum the footprint of the device 2 and therefore to contribute to the management of four or five electrical lines in a footprint of 3 U, i.e. about 54 mm, for a volume of 320 cm$^3$.

In the example described here, the device 2 comprises two processing circuits, namely the measurement circuit 6 and the control circuit 8. As a variant, the device 2 could comprise a single processing circuit, that is to say the measurement circuit 6 or the control circuit 8 alone, or another processing circuit. Likewise, the supply circuit 10 and the pilot circuit 12 could be omitted as a variant, and some or the entirety of their functions implemented directly on the processing circuit. The fifth line used for supplying the device 2 could be omitted or be an electrical line managed like the other four electrical lines, the device 2 then managing five electrical lines.

In the example described here, the pilot circuit 12 comprises a radio or CPI, communication unit with a remotely sited box for controlling the diffuse curtailment. Thus, the pilot circuit 12 receives the raw data from the measurement circuit 6 to derive therefrom the instantaneous consumption on each electrical line linked to the device 2. Furthermore, it can receive data from the diffuse curtailment control box so as to control the control circuit 8 in order to suspend or to modulate the current on one or more of the electrical lines linked to the device 2. Finally, the pilot circuit 12 can also carry embedded intelligence, in order to suspend or to modulate the current on one or more of the electrical lines linked to the device 2 on the basis of local functions, without calling upon the diffuse curtailment control box. As a variant, the pilot circuit 12 can be designed to carry out other functions, such as have discussions with a home-automation system, or any other system in which management of the supply of the electrical equipment is useful.

It should be noted that the present invention finds its application particularly in managing the electrical consumption of low-voltage installations, that is to say exhibiting a voltage of the order of 230V (or 110V) and up to 1000V, and currents of more than 5 A per line, the current being of the order of 20 A per line in the example described. High-voltage (>1000V) or very low-voltage (<100V) power installations do not present the same challenges in terms of combining available volume to house the device and of power to be dissipated.

The invention claimed is:

1. A device for managing electrical consumption, characterized in that it comprises:
   a plurality of connectors capable of each receiving a link to an electrical current line and suitable for forming input connectors and output connectors,
   a processing circuit for managing the electrical consumption on the electrical current lines, to which it is connected, linked to at least one of the input connectors and to at least one of the output connectors, and comprising a printed circuit which receives electronic components,
   a box being able to be installed in a low-voltage electrical distribution board, exhibiting two opposite ends and at least one opening along each end, and housing the plurality of connectors along the opposite ends of the box, and the processing circuit between the opposite ends, at least some of the openings remaining partially free when the connectors receive an electrical line,
   and in that the printed circuit of the processing circuit is disposed in the box so as to define a first separate space and a second separate space, the electronic components capable of conducting currents of at least 5 A being received on the printed circuit so that they are housed in the first space with the plurality of connectors, in proximity to one of the opposite ends of the box.

2. The device as claimed in claim 1, in which at least some of the openings receive at least some of the plurality of connectors.

3. The device as claimed in claim 1, in which, when the connectors receive electrical current lines, a free cross-section of the openings of one of the ends of the box is greater than or equal to a free cross-section of the openings of the other end of the box.

4. The device as claimed in claim 1, in which the processing circuit is a measurement circuit designed to determine an instantaneous electrical consumption on one or more electrical lines linked to the output connectors.

5. The device as claimed in claim 4, in which the measurement circuit comprises a plurality of shunts disposed in the first space, each linked to a respective pair of connectors comprising an input connector and an output connector, and to a device for measuring the current passing through each shunt.

6. The device as claimed in claim 1, in which the processing circuit is a control circuit designed to selectively interrupt the provision of current on one or more of the electrical lines linked to the output connectors.

7. The device as claimed in claim 6, in which the control circuit comprises a plurality of elements chosen from among the group comprising relays, TRIACs-DIACs and thyristors, and in which the elements are disposed in the first space, each linked to a respective pair of connectors comprising an input connector and an output connector.

8. The device as claimed in claim 4, in which the printed circuit determining the first and second spaces is the printed circuit of a control circuit, and in which the printed circuit of the measurement circuit extends substantially orthogonally with respect to the printed circuit of the control circuit, so that the power conductors liable to liberate the most heat of the measurement circuit and of the control circuit are housed in the first space.

9. The device as claimed in claim 1, furthermore comprising a supply circuit disposed in the second space.

10. The device as claimed in claim 1, furthermore comprising a pilot circuit disposed in the second space.

11. The device as claimed in claim 1, characterized in that it is capable of managing an electrical power equal to 23 kW.

12. The device as claimed in claim 1, characterized in that it is capable of managing an electrical power of 426 W per millimeter of width of the box.

13. The device as claimed in claim 1, characterized in that it is capable of managing an electrical power of 72 W per unit volume in cm$^3$ of the box.

* * * * *